Patented June 6, 1944

2,350,732

UNITED STATES PATENT OFFICE 2,350,732

COATING COMPOSITION AND ADHESIVE RESULTING THEREFROM

Richard Gurley Drew, St. Paul, Minn., assignor to Minnesota Mining & Manufacturing Company, St. Paul, Minn., a corporation of Delaware No Drawing. Application June 10, 1933, Serial No. 675,290

1 Claim. (Cl. 106—287)

This invention relates to tapes; more particularly, to transparent tapes, carrying an adhesive; and to methods of making such article, the adhesive compositions carried thereby and to new and useful methods of applying this article.

Recent developments have found it desirable to use as a packaging and merchandising material, thin and transparent sheeted material for its natural display qualities, and serving in the nature of a waterproofing fabric or covering for a layer of printing matter or for the merchandise itself. This packaging material comprises gelatinized cellulosic materials, which result in transparent films, such as regenerated cellulose, cellulose esters, such as cellulose nitrate, cellulose acetate or cellulose ethers, such as ethyl cellulose, or sheets comprising composites of such gelatinized cellulosic materials, such as a layer of film of regenerated cellulose combined with a layer or film of cellulosic compounds. The popularity of these materials resides in such qualities as brilliancy, sheen and transparency, and in the later development of such material, in the waterproofness of this type of packaging material.

In using such transparent films, particularly as result from sheeted regenerated cellulose, the highly glazed surface and character of this sheet have made present types of adhesive unsuitable for adhesively applying this type of sheet or film in position, or for sealing a package made thereof into firm and waterproof contact. Thus where present day adhesives may be useful with paper for sealing a fibrous type of sheeted material, with highly polished transparent sheets, these adhesives are ineffective as a seal, are non-adherent as well as objectionable in that they modify the transparent characteristics of the packaging material, film or sheet and detract from its desirable appearance.

In using gelatinized cellulosic sheets for packaging purposes in which the waterproof characteristics of the film are found desirable, present adhesives are further objectionable, in that they are non-adherent to this type of film and thereby the hermetic sealing characteristic of this sheeting is ineffective. Furthermore, in using gelatinized cellulosic sheeting material, such as known on the market as ordinary Cellophane, the hygroscopic characteristics of this sheeting material have made it objectionable as well as highly undesirable to use an ordinary glue bond as the sole adhesive in that a coating of such adhesive, as well as the moistening operation necessary for applying the same, will unduly warp and curl the transparent sheeting material and deface the package upon which it is used.

It is therefore an object of my invention to provide a sheeted fabric of such material, such as gelatinized cellulosic material, and provide the same with an adhesive therefor, or a coating thereon which in no way interferes with the desirable properties of this transparent film while augmenting the characteristics of waterproofness, where this quality is desirable.

Further objects of my invention reside in the preparation of an adhesive composition which may be applied to backing material, and particularly useful in connection with backing materials comprising smooth, highly polished and transparent sheeted material, such as made from gelatinized cellulosic material which, when so applied, will not interfere with the transparent characteristics of this backing material, and will firmly adhere thereto and act as an efficient bond and seal therefor.

In general, it is an object of my invention to provide an adhesive composition for a backing of clearly transparent material, the adhesive being of the character to be transparent and in equilibrium with the transparent backing material so as to in no way interfere with the desirable characteristics of the composite due to disfigurement by warping, or due to coloration, opacity, resulting from applying the adhesive coating to the backing material.

In preparing an article of the character contemplated by me, comprising a transparent backing material, carrying an adhesive coat, it is preferred that the backing material comprises gelatinized cellulosic materials which result in transparent films, such as regenerated cellulose, cellulose esters, cellulose ethers, such as cellulose nitrate, cellulose acetate or ethyl cellulose or composites of such gelatinized cellulosic materials, such as a layer of regenerated cellulose combined with a layer or layers of cellulosic compounds. I may further utilize a backing material comprising transparent or semi-transparent sheets made from materials other than cellulosic material, and which may include a film of waterproofing material, such as films made of cellulosic compounds, varnishes, lacquers, or the like. Such backing materials may include glassine paper or paper treated to approach transparency and may be used with a certain degree of desirable results.

The product made from regenerated cellulose, though desirable for a great many purposes, has a tendency to be hygroscopic. It is preferred, therefore, to waterproof the film so produced, either on one side or on both sides, with a thin film of nitro-cellulose, cellulose acetate, cellulose ether, and similar cellulosic compounds. It will be understood that the waterproofing ingredients may include oxidized oils, varnishes and lacquers. The primary requisite is the application of these waterproofing films so as not to impair the lustrous and transparent characteristics of the sheet formed and to overcome any tendency to provide a warped sheet by the waterproofing layer that may be applied.

Additionally, coatings such as transparent rubber, synthetic resins, and like materials may be used as a waterproof coating.

In the use of the film as thus provided as a backing material for adhesive tape or for purposes of adhering adhesive tapes thereto, ordinary glue type adhesive tapes are insufficiently adherent by reason of the highly glazed surface provided by this type of backing material. The use of ordinary adhesive tapes detracts from the package formed, where the transparent film is used as the packaging material.

I have found that I may utilize the transparent films of the character above described, having a highly polished, lustrous surface, and form a seal therefor or an adhesive tape therefrom by applying thereto an adhesive layer which is in elastic equilibrium with the backing materials so that it has the full adhesive qualities and does not interfere with or disfigure the transparent or lustrous qualities of the backing material or the sheet to which it is applied by reason of any tendency to warp or curl the same, or where utilized with a backing material of the character described and referred to as gelatinized cellulosic material, whether transparent, colored, opaque or translucent, when coated with an adhesive of the character herein described, made to be in elastic adhesive equilibrium, such film of material may be used and will expose its lustrous surface free from a warped or disfigured effect by reason of the fact that it carries the layer of adhesive.

Where transparency of the adhesive tape is not of major importance but where it is desired to provide a flat, unwarped exposed brilliant and lustrous surface, I have determined that an adhesive coating may be applied to the cellulosic films of the character previously enumerated and obtain a composite in which the adhesive is unified thereto and in elastic equilibrium with the film from a composition made as follows:

EXAMPLE A

A rubber compound and tackiness agumenting agent in the form of a synthetic resin. Proportions suitable for ordinary temperature climates may comprise:

| | Pounds |
|---|---|
| Plasticized, first quality plantation rubber, such as clear crepe or smoked sheets | 10 |
| Cumaron gum or resin | 2 |
| Zinc oxide pigment | ½ |

The cumarin gum or resin is an artificial resinous material coming under the group name of cumarin and indene resins which is the polymerization product of coal tar derivatives. The above ingredients are compounded on a rubber rolling mill to a plastic condition and then cut to desired body or consistency, using a rubber solvent such as benzol or a petroleum solvent, such as high test gasoline.

In lieu of a synthetic resin, I may employ a low boiling point natural resin, e. g., Burgundy pitch or pine oil foots. Burgundy pitch is soluble in both alcohol and benzol.

EXAMPLE B

| | Pounds |
|---|---|
| Plantation rubber | 2 |
| Mexican or wild rubber, high in natural resin content | 5 |
| Zinc oxide pigment | 1 |

The ingredients above enumerated are compounded on a rubber mixing roll and then cut to the desired consistency in a rubber solvent, based upon the necessary viscosity for spreading this material. Ordinarily, in both examples A and B, the solvent is calculated by the number of pounds of solid compound in one gallon of solvent, such as, for instance, 8 lbs. of solid or compounded material and 1 gallon of benzol, which is commonly referred to as an 8 pound cut. The variations in proportions of solvent added will depend upon the desired thickness of adhesive coating required in the residuum.

It will be understood that the examples above given are for purposes of getting the requisite adhesiveness in temperate climates. An increase in resinous material or wild rubber may be made for material to be used in colder climates and in warmer climates the resin component may be reduced.

The resinous component may also be varied in its characteristics in its reactions to solvents by choice of the resinous material. Thus, for purposes of removal of the adhesive from some body to which it may be applied, it may be made soluble to various organic solvents, either benzol, gasoline, acetone or alcohol. Thus, where it is desirable to make a surgeon's tape which is soluble in alcohol, an alcohol soluble resin is added in the examples above cited. Such resin may be Burgundy pitch. This will permit alcohol to be used in removing a piece of adhesive tape from any surface, such as from the skin of a patient, by merely applying alcohol to the adhesive. The rubber, in any event, merely acts as a vehicle for the resin and the character of the adhesive in its reaction to solvents will be dependent upon the character of the resin incorporated with the rubber.

The coating composition previously described when applied is firmly adherent and unified to the backing material and provides a normally tacky and pressure sensitive adhesive coating of a unified character, without in any way curling or warping the transparent gelatinized cellulosic film. When using sheeted material comprising a combination of a regenerated cellulose film or sheet and a film of a cellulosic compound, the adhesives of the character above are particularly adherent and become unified directly with the backing so used.

Where it is desired to obtain a clear composite of backing material and adhesive, the adhesive preferred by me for this purpose may be made as follows:

EXAMPLE C

| | Parts |
|---|---|
| Rubber (double break-down latex crepe) | 200 |
| Para cumaron resin | 85 |
| Wood rosin | 10 |
| Liquid paraffin oil | 5 |

All parts are by weight.

As a variation from the above, where lack of transparency is not objectionable and the addition of a colored hue to the composite of backing and adhesive material desirable, the formula may be varied as follows:

EXAMPLE D

| | Parts |
|---|---|
| Rubber (latex crepe) | 250 |
| Zinc oxide | 225 |
| Pine green light colored pigment | 25 |
| Wood rosin | 137 |
| Liquid paraffin oil | 30 |

This type of adhesive is normally tacky and pressure sensitive and has a greenish opacity. It will be understood that where a different color is desired to be imparted to the transparent film backing material, the pigmenting material may be correspondingly varied. Coloration in the adhesive may be used to neutralize or vary objectionable shades or colors in the transparent backing material.

If desirable, dyes may be used particularly to preserve the transparency and attractive sheen of the composite, or the color (pigment or dye) may be added to the backing material itself. In either method of addition, where dyes are desirable and particularly for a clear blue transparency, indamine blue is suggested as of value for this purpose; pigmenting may be accomplished by such material as Prussian blue.

In the examples given above, paraffin oil has been included for purposes of plasticizing the rubber.

I have found that in order to obtain maximum transparency and the highest possible bond strength and firmness of the adhesive inter se, to avoid offsetting of the adhesive coating, that the paraffin oil may be omitted.

Such adhesive coating, particularly valuable for this purpose, is as follows:

FORMULA E

| | Parts |
|---|---|
| Rosin | 160 to 200 |
| Thin latex crepe rubber | 250 |
| Beta naphthol | 2.5 |

Approximately 3248 parts of benzol may be added to the above ingredients to provide a readily spreadable cement, and the ingredients may be incorporated in the benzol without the necessity for milling.

In the example given, beta naphthol has been specified and this is primarily used as an antioxidant. This material is desirable in the above formula, as well as in the other formulae given under A, B and C, in that the adhesives are given longer life.

Other anti-oxidants are desirable and may be included wherever rubber is used in the adhesive. Such anti-oxidants which may be used are as follows:

(1) Aldol-alpha-naphthylamine.
(2) Phenyl-beta-naphthylamine.
(3) Symmetrical - di - beta-naphthyl-para-diphenylene-diamine.

In the examples as above given, the preparations are by weight and variation may be made in the primary materials, as well as the quantity of the ingredients. Thus, in the examples given under C, D and E, latex crepe, the rubber component, may be varied by substitution in part or in whole by smoked sheet rubber. Though the synthetic resins, such as cumarin resins above referred to are preferred, various blends of other synthetic resins may be utilized, in part or in whole. To a certain extent, the wood rosin may be substituted by various grades of gum rosin.

In making the adhesives, the rubber base and the resin base determine the tackiness exhibited by the finished product. This relationship, also coupled to a certain extent with the treatment given to the rubber, determines this factor.

In producing a clear adhesive, the relationship of plasticizer (above listed in the form of liquid paraffin oil) and resinous material may be considered as constituting the tack producing phase of the adhesive and the greater the quantity of the tack producing phase that is added to the rubber, the greater the tackiness exhibited in the rubber base adhesive.

In general, for every two parts of rubber base, by weight, one part by weight of the tack producing phase may be added. As indicated above, the resinous content may be varied to increase the tackiness. However, in order to provide a unified adhesive, satisfactory for purposes of unwinding of the tape from rolls, the resinous content must be retained within certain limits beyond which the adhesive is likely to offset at normal atmospheric temperatures. For practical purposes, from one to two parts of resin or the tack producing phase may be included to every one part by weight of rubber.

In the formulae above cited, double break down latex crepe rubber has been referred to and the treatment of this product alone, as well as the addition of the tack producing phase therewith, will control the characteristics of the adhesive layer. Thus, double break down latex crepe, as contemplated by me above, results from milling latex crepe rubber for approximately fifteen minutes to plasticize the same, with or without heat, and after ageing for twenty-four hours, is again plasticized in a mill. At this stage, the material is suitable for addition to, or with, the materials constituting the tack producing phase. This may be accomplished as follows:

METHOD A 200 parts of rubber (double break down latex crepe from the rubber mill as above described) are placed in an internal mixer where the para Cumaron resin, wood rosin and paraffin oil (where this is used) are added gradually during the mixing operation to thoroughly incorporate the same into the rubber. No solvent need be used if the mixer is powerful enough to knead these resinous materials into the rubber. When the mixing has been thoroughly accomplished, a solvent such as benzol is introduced while the internal mixer is maintained in operation. This action is continued until complete solution results. The quantity of solvent added is in accordance with the means to be employed for spreading this material upon the backing material. It may, however, follow the preparation indicated above under Example B.

METHOD B 200 parts of rubber (preferably double break down latex crepe as above made) are placed in a stirring equipment where paddles agitate the solvent and other ingredients into solution. When 200 parts of rubber have been placed into this mixer, the agitating member is started and a quantity of benzol added to dissolve the rubber. The resinous materials, in this particular example, para Cumaron resin, wood rosin and the liquid paraffin oil (where this is used), are dissolved in a separate mixer, using an additional quantity of benzol as a solvent. When these parts are uniformly distributed and in solution, the parts from each mixer are combined. The quantity of benzol is calculated in accordance with the method which may be used for spreading it upon the backing material and the proportions are chosen as in the example above recited immediately following Examples A and B above, and/or as more particularly pointed out hereafter. The solvent is separated after coating or spreading of the adhesive upon the backing material.

In use, the adhesive as above described, may be directly applied to the backing or sheets of transparent gelatinized cellulosic materials, previously enumerated, and forms a desirable product. Where a sheet is made of gelatinized cellulosic material which includes a waterproof coating, the adhesives as described may be directly applied, with very efficient results.

Where considerable unification is desired between the adhesive layer and the backing material, to assure proper anchorage of the adhesive layer with the backing material, thereby assuring satisfactory unwinding or separation when the composite is formed into rolls or stacks, it is preferred to first coat the sheet of gelatinized cellulosic material with a priming composition.

The priming composition as preferred by me is a solution of a rubber-resin mixture in an organic solvent in which the solid materials may be varied from 15 to 50%, with 85 to 50% of the solvents used. Preferably, the solids constitute about 17% of the solution so prepared.

*Primer type 1*

A preferred composition comprises:

| | Parts |
|---|---|
| Rubber (latex crepe) | 2 |
| Resin (such as pine pitch or wood rosin) | 4 |
| A filler, such as whiting (optional) | 1 |

These two or three ingredients, as listed, constitute the solid components in the priming mixture above enumerated.

The priming composition so prepared is one which, upon deposition and volatilization of the solvent, will exhibit slow solubility upon treatment with the same solvent. In general, it is preferred, therefore, that the deposition product resulting from coating with the priming composition be one whose solid components retard the solvent action of the overlying material when coated thereon as a solution. That is, the solids which may be contained and are present in the primer composition are of such a nature that after deposition they are difficultly soluble in the solvent used for plasticizing and coating the adhesive layer. In the example above given, such properties may be imparted to the deposition product by utilizing rubber which has been partially vulcanized, this solution being effected by plasticizing in a mixing device such as an internal mixer in the presence of heat, sufficient to render the mass sticky. As an additional operation, a solvent retardant may be added and, to a certain extent, the filler indicated in Primer Type 1 above serves this purpose. Though whiting is illustrated and preferred, those fillers which tend to exert an insolubilizing effect upon the rubber may also be used, such as zinc oxide.

Though it is indicated that high grade vulcanized rubber, plasticized to tackiness, may be utilized with some degree of success in the example above cited and identified as Primer Type 1, it is preferred, particularly where transparency is desired, to use the combination of ingredients above identified, and to merely add during the mixing operation the requisite quantity of sulfur and accelerators. The quantity of these ingredients if any is merely sufficient to render the rubber component difficultly soluble in the solvent present in the solution of the adhesive composition, so made for spreading purposes, without reducing the quality of this priming coat to unify with the adhesive layer superimposed thereover.

*Primer No. 2*

Rubber, in the form commonly referred to as latex crepe, with the resin content, in the proportions above indicated has added thereto sulfur and accelerators. These are vulcanized with heat after intimate admixture and while in the softened condition, are mechanically milled until a sticky mass, soluble in benzol or naphtha, is obtained. The amount of benzol or naphtha added is to obtain the requisite fluidity and these solvents may be added to the solid components in quantities of from 50 to 85%, as compared with the rubber and resin content.

Additional examples of primers which anchor the adhesive coating to regenerated cellulose such as Cellophane waterproofed or untreated (ordinary), are as follows:

*Primer No. 3*

| | Parts |
|---|---|
| Selected tube reclaimed rubber | 90 |
| Latext crepe rubber | 10 |
| Whiting | 40 |
| FF wood rosin | 140 |

*Primer No. 4*

| | Parts |
|---|---|
| FF wood rosin | 2 |
| Rubber (latex crepe) | 1 |

*Primer No. 5*

| | Parts |
|---|---|
| FF wood rosin | 2 |
| Rubber digested with alkali to remove non-rubber hydro-carbons—crude rubber or latex crepe may be thus digested with alkali for the purpose stated | 1 |

*Primer No. 6*

| | Parts |
|---|---|
| Selected inner tube reclaimed rubber treated rubber treated further to remove pigment | 90 |
| Latex crepe rubber | 10 |
| FF wood rosin, preferably Solros (a soluble resin whose soluble constituents and melting point are increased by a distillation process) | 140 |

This last primer is particularly transparent, and useful in connection with regenerated cellulose, such as Cellophane, ordinary uncoated or that which is waterproofed by an additional film, a material which renders it nonhygroscopic.

The primers above described under 1 and 2 may be further rendered resistant to the solvent action of the overlying adhesive to be applied in a subsequent step by the use of a priming composition which, upon aeration after application to the backing material, becomes vulcanized. Such material may be a material known on the market as Vulcoloc. This material is to the best of my knowledge, a reaction product of rubber and a sulphur bearing acid.

In its use, Vulcoloc is applied to the backing material and the layer so applied is permitted to age, to result in ageing and vulcanization of the rubber used in the primer, prior to the application of the solution of adhesive material. Application of an organic solution of the adhesive does not effect the coating of the Vulcoloc primer as applied.

Another material particularly suitable because of its inertness to solvents of unvulcanized rubber where this material constitutes the water insoluble rubber base adhesive coating, is an artificial or synthetic rubber known as Duprene, which is probably a polymerized diolefine compound.

In general, the primer layer is one which makes satisfactory bond with the regenerated cellulose backing material, or the gelatinized cellulosic material constituting such backing material, which may include a waterproofing layer of cellulosic compounds. Such materials may be a layer of a synthetic resin, such as one of the group of polyhydric resins which makes excellent union with gelatinized cellulosic materials and with rubber. In the event that it is desired to wholly eliminate the primer layer and waterproof the backing material of regenerated cellulose, where this is used, the waterproofing layer over the regenerated cellulose backing material is one which has affinity for the adhesive coating with which the adhesive coating makes better anchorage than would be the case if the regenerated cellulosic film alone were used. Such waterproofing materials may be a highly plasticized nitrocellulose or cellulose acetate, oxidized and gelatinized drying oils, synthetic resins, such as phenolic condensation resins, or those of water white characteristics, such as urea resins. Those ingredients are chosen, as above indicated, which will be difficultly soluble in the solvent used in the solution of the adhesive layer composition subsequently applied thereto so as not to disrupt the waterproofing coating where the priming layer is used for this purpose, or prevent dissolving the dry priming coating, to thereby provide a weakened structure preventing proper unification between the adhesive coating and the backing material.

The adhesive composition as deposited upon the film heretofore described is one which is normally tacky and pressure sensitive. It is of particular utility in connection with the lustrous, highly polished backing material described in that the adhesive layer is in equilibrium with it and will not alter or warp its appearance. As indicated, the adhesive layer is unified in that it has great adhesion inter se and when applied as indicated, forms a unified product with the backing material. When wound into rolls or formed into stacks, the lustrous surface of the backing will not be modified, no offsetting will occur and ready separation is assured of the entire composite from its adjacent layer. Where the product is to be used in temperate climates and may encounter higher temperatures, it may be desirable to coat the back side of the backing material with a thin film of glycerine or lightly dust this surface with talc, flour or starch. In such event, a protective coating is applied which is not distintegrated by or which does not interfere with the adhesive action of the adhesive layer.

In the procedure heretofore described, I have indicated that it is preferred to have the adhesive coating as one which is normally tacky or pressure sensitive and that the adhesive layer is in adhesive equilibrium with the backing material described, to preserve the luster and sheen of the backing or its transparency, where this is desirable. It may be desirable, under certain conditions, to modify the adhesive layer to a condition where it is normally "dry" and is not normally pressure sensitive but may be energized to become adhesive by a moistening agent, to render it suitable for application as a seal, adhesive member, etc.

I have found that I may retain all the desirable characteristics of using a transparent backing material, or a highly polished and lustrous backing material, together with an adhesive layer and maintain the composite so formed in elastic adhesive equilibrium, to retain the highly polished, lustrous and/or transparent characteristics of the backing material, by a variation in the components of the adhesive layer, to obtain a product in which the adhesive layer is normally dry, and that I may further retain all these desirable characteristics, even though applying a moistening agent which serves to energize and render adhesive the normally dry coating or layer of adhesive material. Such a material as contemplated by me is one which is suitable for use in a dispenser type of applicator for adhesive tapes. In this type of article generally, a roll of the composite adhesive tape is fed in contact with a moistening agent, which exerts a solvent action upon the adhesive layer and thereby activates it and renders it sticky. In this condition, the tape or layer of material is applied for permanent adhesion as a seal or tie for a package, or for other purposes, such as packaging or covering arrangement. Upon setting or drying of the adhesive layer thus moistened, permanent adhesion is experienced, even when the adhesive is contacted and applied to highly polished lustrous surfaces, characteristics of gelatinized cellulosic materials, cellulosic films, or, in fact, any other type of surface. The exposed back of this tape or layer carrying the adhesive is not affected by the moistening and drying action and will expose the backing material with substantially its original lustrous and highly polished surface, and with the transparency of the original material, where this type of composite is used. Where used for a seal the joints are of exceedingly high strength and are waterproof in character. The tape so formed is particularly suitable in connection with films of regenerated cellulose, whether waterproof or not, and is capable of use whereas an ordinary glue base adhesive when used alone will otherwise alter and warp the regenerated cellulose film (where this is used).

As an example of the adhesive layer in making a composite of the character above described, the product may be made as follows:

FORMULA E*a*

| | Parts |
|---|---|
| Reclaimed rubber (selected tire tube reclaim) | 90 |
| Fresh rubber (latex crepe) | 10 |
| Zinc oxide | 86 |
| Water white rosin | 140 |

The rubber components are milled thoroughly with the zinc oxide, then dissolved in a suitable solvent which carries the rosin in solution and the entire mixture is then stirred to a smooth and homogeneous product. The quantity of solvent used in connection with the above is in accordance with the heretofore cited examples of adhesives and, in general, benzol may be used as a solvent. The solid components may constitute from 50 to 15% whereas the solvent may be from 50 to 85%. Preferably 17% solids to 83% solvent is used.

As a variation from the above, an adhesive coating of the character above referred to may be prepared from the following:

FORMULA F

*Solution A*

| | Pounds |
|---|---|
| Rubber (latex crepe) | 50 |
| Zinc oxide | 50 |
| Rosin | 250 |

*Solution B*

| | Pounds |
|---|---|
| Hide glue | 100 |
| Water | 200 |

Solution A is first prepared by dissolving the solid components comprising rubber and rosin in an organic solvent. The solvent is preferably benzol from 50 to 85% of the mixture as compared with 50 to 15% of the solids. Preferably, however, Solution A is one which constitutes 30% of solids and 70% of solvent.

Solution A may be made by milling the rubber with the zinc oxide and the rosin and then adding the organic solvent, comprising benzol. Preferably, however, the rubber is milled, has added to it gradually the zinc oxide component and during the milling operation of these two, the rosin component dissolved in the solvent is gradually added until the dissolution of the components is effected.

Solution B is prepared by swelling the hide glue in a minimum quantity of water over night and then after the hide glue has been completely softened, the full water component is added. The adhesive as contemplated by this formula is completely prepared by emulsifying the glue solution and the rubber solution so that the rubber solution is in the continuous phase and the glue solution in the dispersed phase.

In the above example, corn starch and dextrin may be substituted for the hide glue. Mixtures of glue and corn starch have also been found desirable.

As a still further variation of the above, I may prepare an adhesive suitable for my purposes in making a dry adhesive as follows:

FORMULA G

| | Pounds |
|---|---|
| Rubber (preferably thin latex crepe) | 262 |
| Zinc oxide | 262 |
| Wood rosin (preferably Solros) | 1,300 |

The mixture as above indicated is made by milling the rubber and zinc components and then adding enough benzol to place the rubber in solution and thoroughly sustain the zinc oxide. When solution has been effected, the rosin, in benzol, is added and the entire batch mixed to effect a thorough distribution of the rosin and the rubber components. The rosin as chosen in the above example and known on the market as Solros is one which has been particularly treated to render it non-crystalline, and to reduce the quantity of its components which are insoluble in mineral oil.

In the examples cited above under Formulae E, F and G, the quantity of the rosin as compared with the rubber will be determined by the reduction of tackiness which may be desired to be imparted to the rubber and the requisite speed of setting and hardening of the adhesive surface after moistening and application of the composite carrying it. The larger the quantities of the resin added in proportion to the rubber, the slower will be the action of setting after volatilization of the solvent which upon reduction of the resin will tend to retain tackiness in the adhesive coat. I may add from ¼ to 6 times the quantity of resinous material, particularly those resins described, to rubber and retain the desirable characteristics of the adhesive coat in the final sheet.

Though I have described as a particular relationship of resinous material to rubber as coming within the range of ¼ to 6 parts of resinous material to one part of rubber, a particularly desirable form of solvent activatable adhesive coating may be obtained from the following:

FORMULA G*a*

| | Parts |
|---|---|
| W. w. rosin (water white) | 3 |
| Flexo resin | 3.2 |
| Zinc oxide | 2.0 |
| Latex crepe | 2.0 |
| Oleum spirits | 12 |

The Flexo resin above referred to is an oxidized and polymerized terpene, polymerization being effected concurrently with partial air oxidation.

In the formula above given, the zinc oxide may, wherever specified, be omitted.

Though the ingredients above given are preferred, the ingredients may be varied within wide limits.

It would be desirable to observe the relationship of the rosin and the Flexo resin mentioned so as to retain the rosin from 2 to 5 parts and the Flexo resin from 3 to 6 parts.

In general, the latitude allowable is preferably such as to have the relationship of these ingredients in connection with the latex crepe and oleum spirits, such as to maintain a relationship of 2 parts of rosin and 3 parts of Flexo resin, to 5 parts of rosin and 6 parts of Flexo resin. The total resin-rosin content should preferably be kept above 5 parts and below 11 parts, as the limit below the lower figure tends to give a product which is too tacky, and the higher figure, a product which is too brittle.

In the formulae given, the zinc oxide content may be varied from one half to four parts, though as previously stated, this ingredient may be omitted.

In the above formula, oleum spirits have been referred to. This is a hydrocarbon solvent of indefinite boiling point, its boiling range falling between its initial boiling point of 306 degrees F. and its end point of 424 degrees F.

Though I have included in the formulae illustrated an ingredient which is not soluble in the mixture of rubber and resin, such as zinc oxide in the Formulae E and G, and zinc oxide and an aqueous ingredient in Formula F, these are cited merely by way of example. In general, they are included where the tape is submitted to a rubbing action during the moistening operation and some degree of body is desired to be imparted to the film forming the adhesive layer and also where a proper moistening of the film is desired without displacement due to such solvent action as the moistening agent may exert upon the adhesive film.

Thus, in the Examples E*a* and G, zinc oxide, and in Example F, zinc oxide and dispersed glue act, to a certain extent, to properly control the moistening action upon the adhesive layer by the moistening agent that may be used, serving in the nature of a film control filler.

The adhesive as prepared in solution in the requisite solvent, such as benzol, is applied to a backing material, as by the method aforesaid, such as by passing the film of backing material through a set of squeeze rolls, one of which dips into the solution of the adhesive material to transfer the adhesive to the backing material, after which the solvent is removed by passing the web of material through suitable drying chambers or ducts. Though the application of the adhesive to the backing material may be preceded by a priming coat and though this is found desirable in applying a normally tacky and pressure sensitive adhesive coating, this is not found necessary in applying the aforementioned adhesive, which is intended to leave a dry coating as the adhesion of the adhesive compositions, including the high quantity of rosin or resinous material, is so intense as not to require this preliminary treatment. Especially is this true when applying the formulae of adhesives under Examples E, F and G to a fibrous type of backing material. This type of adhesive is particularly useful for this purpose and instead of utilizing the highly lustrous, glossy and/or transparent films of gelatinized cellulosic material, the adhesive thus described, suitable for forming a dry surface, is admirably suitable for application to paper backing material, such as kraft paper. In this direction it is preferred that such paper known as sixty pound kraft paper be utilized. I may also use "unified" backing material prepared in accordance with my application, S. N. 281,104, now Patent No. 1,760,820. Where the the paper has been "unified" by an impregnation with a glue base material, a priming coat may be desirable and the primers described in my last mentioned patent may be used.

The backing materials, including the adhesive coating as above described, may then upon drying of the adhesive, be directly formed into rolls or stacked. Where a fast setting adhesive coating is found desirable so that a lower quantity of resinous material is used in proportion to the rubber component, there may be a tendency, especially in the warmer climates, for the adhesive coating to have a tacky reaction, particularly at the time when the web of material is wound into rolls. At this point, the unwinding properties may be improved by dusting talc or starch upon the composite formed by the paper and adhesive, so that a separating coat of starch or talc lies between the paper and adhesive surface when webs of this composite are formed into rolls. Preferably this may be accomplished by dusting with a minute quantity of starch or talc, the dry coating of adhesive.

While I have above described the preferred range and specific percentage of solids to solvents for the primer composition, it will be understood that the solids may constitute 100 to 0% and that where 100% solids are used, the method of application described previously in the specification may be used. Where no solids are used, the solvent is applied just immediately preceding the application of the adhesive coat. While still wet the adhesive coat is applied to assure greater anchorage of the adhesive coating to the backing by its solvent action on the coating and backing material.

Where pyroxylin is used for the waterproof layer covering a regenerated cellulose sheet or one already coated with a sealing coat of this material, it may be plasticized by a quantity of resinous material in proportions of about 67% to 50% of resinous material to about 33% to 50% of nitrocellulose material. Under such conditions, the solvent necessary to render the waterproof coat active for adhesion may be the ordinary known solvents for nitrocellulose without modification. In such event, no other coating of adhesive material need be applied. As a more particular formula for the coating composition, the following is an illustration, viz:

| | Pounds |
|---|---|
| Nitrocellulose such as "½ second cotton" | 9 |
| Cellosolve, which is ethylene glycol ($C_4H_{10}O_2$) | 15 |
| Resin such as Rezyl 12, which is a condensation product of castor oil and phthalic anhydride | 12 |
| Dammar cut, which is a solution in the proportion of 40% dammar resin and 60% benzol | 16 |

The above composition may form the adhesive coating of a normally dry character upon volatilization of the solvents and may be activated to adhesiveness by the normal solvents for nitrocellulose.

A composite as made in accordance with the above may be mounted upon a dispenser of the kind now generally used in connection with glue bond adhesive tape and the adhesive surface may be activated by organic volatile solvents, such as gasoline or benzol. These solvents, though inflammable, may be readily utilized if care is exercised to prevent the volatile portions of these solvents from coming in direct contact with highly heated objects or open flames. Otherwise, non-inflammable chlorinated hydrocarbons, such as carbon tetrachloride or ethylene di-chloride may be employed. When moistened by organic solvents, particularly those above enumerated, the adhesive film becomes rapidly activated and may be immediately applied to a large number of surfaces and will set with greater rapidity than that experienced with adhesive tape which is moistened with water and utilizes a glue base adhesive layer. When the coating as above described is applied to the film of gelatinized cellulosic materials, the lustre and brilliancy of the film will not be impaired and where this backing material is transparent, no warping will occur which will tend to defeat the purpose of using this type of material, as the adhesive layer, as in the case previously enumerated, is in elastic equilibrium with said surface to which it is applied or with which it comes in contact. Any packaging material using this seal will stand crumbling or sharp bending without becoming disengaged at the point so sealed.

Where the film of packing material comprises composites of gelatinized cellulosic materials, such as regenerated cellulose coated with cellulosic compounds, such as nitrocellulose or those other waterproofing ingredients previously enumerated as used in connection with regenerated cellulosic films, the dispenser type of adhesive enumerated under Formulae E, Ea, F and G may be directly applied. Greater tenacity may be experienced with regenerated cellulose surfaces, particularly those which may have been softened by the addition of glycerine, by the addition of small percentages of the primers heretofore described to the adhesive enumerated under Formulae E, Ea, F and G, or by the application of a primer layer of the character hereinbefore described.

When the dispenser type of adhesive is applied to paper backing material, moistening of the adhesive with an organic solvent before application for a seal or similar purposes, will not weaken the paper even though the moistening agent may be excessively applied and the full strength of the backing material is retained. Where used upon transparent backing material, such as gelatinized cellulosic films, the adhesive after setting will tenaciously affix itself to the highly polished surfaces and will thereby form an effective waterproof and water tight seal.

Coated upon paper backing, a more positive adhesion is obtained in its application to various uses. A greater rapidity in setting lends itself toward a more rapid fabrication in such processes as may involve the use of adhesive tapes, such as in the fabrication of cartons, paper boxes or similar products. Similarly, paper coated with these adhesives may be made up into corrugated boards with greater rapidity and provide a resulting product of great strength in that it resists the moistening action resulting in storing the products contained in such packages under conditions which would ordinarily disintegrate and weaken glue base adhesive products. Thus, dressed meats and dairy products may be stored in cartons utilizing this type of adhesive tape, and be stored in refrigerated rooms for long periods of time without disintegration. The adhesive will equally adhere to asphalt coated paper or wax coated fabrics or paper treated in this fashion, to be resistant to oils and fats and obtain secure adhesion and proper anchorage. The composite of adhesive and backing material is valuable in providing a product which is absolutely impervious to high humidities and permits direct application of water without disintegration. The composites of backing material and adhesive will not become disintegrated or become weakened or inactive by prolonged storage under moist or adverse storage conditions, detrimental to present day glue base adhesive tapes.

Though I have described as one phase of my invention, the preparation of adhesive tapes or sheets made upon cellulosic backings in which the coating comprising the adhesive layer is a pressure sensitive material or organic solvent-activatable material, the particular characteristics of which are their water insolubility, such materials may also include adhesive coatings which have substantially the same characteristics in relation to the backing material, but which are of the water soluble or water-activatable type.

Thus, it is contemplated by me to provide cellulosic materials or cellulosic compounds as hereinbefore enumerated, such as regenerated cellulose, with or without waterproofing coatings, of the character previously enumerated, or cellulosic compounds, such as nitro-cellulose, cellulose acetate, cellulose ethers, or mixed ethers and esters of cellulose, and to some extent, highly transparent or translucent papers, such as glassine paper with adhesive coatings which are water soluble or water activatable, giving a fabric in all respects comparable to two classes of materials previously described and referred to as pressure sensitive adhesive materials, or solvent activatable adhesive materials.

In relation to backing materials of transparent characteristics or semi-transparent characteristics, I have been able to produce adhesive sheets comparable to a certain degree with that previously enumerated with water insoluble coatings, as to lustre, transparency, by providing the backing materials previously enumerated with water soluble coatings.

For the production of adhesive material which is normally pressure sensitive and which is water soluble, the following may be given as an example:

FORMULA H

| | Parts |
|---|---|
| #1 glue | 280 |
| Water | 280 |
| Glycerine | 840 |
| White sugar | 210 |
| Beta naphthol | 2.8 |

As another embodiment illustrative of a pressure sensitive adhesive, the following may be given:

FORMULA I

| | Pounds |
|---|---|
| Glue (dry) | 250 |
| Water | 250 |
| Glycerine | 750 |
| Granulated sugar, or 75% of the dry glue weight | 187½ |

The composition may be made by swelling the glue with a quantity of the specified water, assisted by warming and thereafter, the granulated sugar and glycerine are added with the remaining quantity of water. The glycerine is used for its flexibility augmenting and water-retaining properties and the sugar is used not only because of its water-retaining properties, but also because it produces a desirable modification of the glue-glycerine-water gel structure in imparting to it increased toughness and adhesiveness.

In general, it is preferred to use organic compositions as modifying agents for glue base adhesives; and such modifying agents may be included to impart various properties to the final adhesive composition such as flexibility, tackiness, moisture retention, slow solubility in water, and, in some cases it is desirable to add inert matter as a filler. The following is a list of organic modifying agents which may be used in glue base adhesive compounds:

(1) Glycerine (crude or refined).
(2) Honey (crude or refined).
(3) Glucose.
(4) Sulphonated castor oil.
(5) Water soluble vegetable gums such as tragacanth or gum arabic.
(6) Venice turpentine.
(7) Small percentages of drying or non-drying oils.
(8) Shellac.
(9) Paraffin or other waxes.

In the claim where I use the term "organic glue modifying agent" I mean to include thereby such agents as above listed which in certain cases serve as substitutes for the components listed in the formulae.

In the present form of my adhesive, where I use sugar and glycerine as the glue modifying agents, the adhesive is prepared as follows: the quantity of glue is swelled in water, the action being facilitated by warming. Separately, I fuse the sugar and glycerine content by mixing the same at a temperature of about 250 degrees F. The temperature is preferably retained below 300 degrees F. Temperatures in excess of 300 degrees F. and up to 350 degrees F. will produce an entirely different result. The water-glue mixture and the sugar-glycerine mixture are then combined, preferably at the lower stated temperature. The material so prepared may be spread upon any fabric webbing to obtain a non-drying adhesive coating. This non-drying adhesive coating has been found to be particularly suitable by reason of its water-soluble character. A sugar-glycerine modified glue adhesive has been found to have particularly desirable characteristics of water carrying capacity, preventing ageing or drying of the adhesive. The glue or gelatine has had imparted thereto increased body and toughness.

In the preparation of the adhesive above described, the highest quality hide glue has been found to be most practical for use in the production of an adhesive best suited for a non-drying tape. Many kinds and grades of glue may be used and still produce the desirable results, also some of the water soluble vegetable gums such as tragacanth, acacia, and gum arabic may be used. Inferior gums or hide and bone glues have certain valuable characteristics, among which is the possibility of introducing solid materials without increasing the setting properties or jell strength of the adhesive. The working properties of the adhesive may thus be controlled by the proper selection of the solid material in accordance with the varying climatic and atmospheric conditions or to the more particular tastes of the user to modify the aggressiveness of the adhesive to render the same more rapid in its action or retard the same. These solid materials may be magnesium carbonate, lead oxide, whiting, zinc oxide and what may be termed paint pigments.

As an additional example of a pressure sensitive adhesive coating using a mixture of gelatinous materials, the following may be given:

EXAMPLE J

| | Parts |
|---|---|
| Irish moss | 8 to 15, preferably 10 |
| Gelatine glue | 0 to 10, preferably 8 |
| Glycerine | 45 to 75, preferably 60 |
| Water | 125 to 275, preferably 125 |

This solution as above described may be used for coating purpose, and after coating in the percentages above given is aerated or heated to drive off substantial portions of the water so that in the final film, the glycerine and water content will be approximately equal to each other.

A still further example of a pressure sensitive adhesive of the water-soluble character, may be as follows:

EXAMPLE K

| | Pounds |
|---|---|
| Hide glue | 100 |
| Water | 137 |
| Glycerine | 400 |
| Calcium chloride | 37 |
| Beta naphthol in alcohol (1% solution) | About 2 |

As a still further example of a pressure sensitive adhesive, the following may be used:

EXAMPLE L

| | Parts |
|---|---|
| #2 glue | 50 |
| Aqua resin | 50 |
| Water | 75 |

The aqua resin as above referred to is in the nature of a water soluble resin made by the condensation of polyhydric compounds with acids, particularly by the condensation of glycols with acids. Preferably, a compound made to result in a glycol bori borate, is used. Somewhat similar, though not as desirable results may be obtained by using glyceryl bori borate, instead of the glycol bori borate resin, previously mentioned. The aqua resin mentioned is used as a plasticizer and flexibility agent, as well as, to some extent, as a moisture retaining or hygroscopic material, to retain the film flexible, and where used in sufficient quantities as above enumerated, as a backing augmenting agent.

In the examples given though glue has been specified, other gelatinous materials, such as gelatine, casein, gum arabic, and other water soluble gums and albumens may be used, though glue is preferred by me.

As further examples of materials serving as tackiness augmenting and moisture retaining agents, the following may be enumerated:

(1) Glycerine.
(2) Triethanolamine.
(3) Glycol.
(4) Diethylene glycol.
(5) Carbitol (diethylene glycol monoethyl ether).

In the examples above given under Formulae H to L, the adhesive may be directly coated upon the transparent or semi-transparent cellulosic materials, such as glassine paper, preferably transparent sheetings of the regenerated cellulosic type, such as Cellophane, to provide water soluble, normally pressure sensitive adhesive coatings upon these backing materials. Where the backing material comprises regenerated cellulose, which has been flexibilized by the treatment with glycerine, the water soluble, pressure sensitive adhesive coatings may be directly applied thereto and fairly good anchorage may be obtained, particularly with the water soluble, pressure sensitive adhesive coatings given under Formula H and Formula L, and to the further extent that with these last named ingredients and for portions in particular, the Formulae H and L provide exceedingly transparent composites corresponding substantially in all respects to that obtained with the water insoluble, transparent adhesive coatings, retaining the adhesive coating in "elastic adhesive equilibrium" with the backing material.

Where I have found that the water soluble adhesive coatings given under Formulae H and L are particularly desirable in connection with transparent cellulosic backing materials, the use of the impermeable transparent sheeting as supports for and in connection with the adhesives made under Formulae I to K, inclusive, provide desirable products to the extent that the impermeability of the backing material will serve to maintain the water soluble adhesive coatings flexible and substantially without variation and deterioration for prolonged periods of storage when they are formed into rolls or stacks.

Where the backing material is of a waterproofed type, such as regenerated cellulose coated with a thin film of nitrated cellulose or cellulose acetate or these cellulose esters with additional modifying and plasticizing agents; or the backing material comprises substantially entirely cellulosic compounds, such as nitrated cellulose or cellulose acetate, it may be desirable to facilitate the anchorage of the water soluble adhesive coating by interposing a priming solution before applying the water soluble adhesive coating.

The priming coat preferred by me is of the emulsion type and may be made from the following:

*Primer type 7*

| | Pounds |
|---|---|
| Casein | 3 to 8, preferably 5 |
| Water | 9 to 40, preferably 30 |
| Concentrated ammonium hydroxide | 1 to 8, preferably 3 |
| Rubber latex (preferably 60% concentration) | 3 to 25, preferably 16 |

The ageing qualities of the above primer may be increased by adding maleic acid, preferably in the proportions of 1 pound of maleic acid to the preferred total ingredients above enumerated.

The characteristic features of the primer above enumerated are that it is compatible with the backing material where it is regenerated cellulosic, such as Cellophane, flexibilized with glycerine, or such cellulosic material including the cellulosic compounds previously enumerated, coated with waterproofing materials, and it is also compatible with any of the previously mentioned water insoluble, pressure sensitive adhesive coatings and the water soluble adhesive coatings.

The emulsion primer just described is also particularly useful in connection with the preparation of semi-transparent or translucent tapes in which paper, treated to render the same semi-translucent, is utilized and which transparency is augmented by treatment with a resinous material or varnish to enhance the transparent characteristics. The two phase or emulsion type primer just described facilitates the application of any of the normally pressure sensitive adhesive coatings, whether of the water soluble or water insoluble type.

In the primer of the emulsion type or double phase type, previously enumerated, I have referred to the use of casein in connection with rubber latex. The casein is more or less water soluble, especially in the presence of the ammonium hydroxide and not only facilitates anchorage to glycerine treated Cellophane, but is also compatible with the water soluble type of adhesive coating when the priming coat is finally dried. This water soluble material, as included in the primer, may be supplemented by, or substituted by glue, isinglass or gelatine, and other similar water soluble materials, which not only facilitate the dispersion of the latex but also include the feature of being compatible with water soluble materials. It will further be noted that though in the preferred form of the primer, where casein is used, it is preferred to use ammonium hydroxide in order to facilitate the solution of the casein, the quantity of ammonium hydroxide may be reduced where other water soluble materials are used and merely sufficient ammonium hydroxide is used to prevent untimely separation of the solids of the rubber latex.

The rubber included in the emulsion type of primer is for purposes of having some material compatible with the water insoluble coating and while I have specified in my preferred form of primer, the inclusion of a dispersion of rubber latex, artificial resins, particularly those which will give a clear and colorless or water-white residuum may also be used, and some of the glyptal or urea resins may be substituted for the dispersion of latex to obtain some degree of desirable results.

In general, my emulsion type primer may be characterized as a double phase primer to the extent that it includes emulsified ingredients of both water soluble, and water insoluble characteristics, in dispersed form.

It will be understood that in the application of the primer to the backing material, drying is effected after coating, before the adhesive coating is applied.

In the examples given above for the preparation of a water soluble, pressure sensitive adhesive coating, the pressure sensitive adhesive qualities are dependent more or less upon the quantity of water retained by the plasticizing ingredients, after coating the adhesive composition upon the backing, and aeration, to reduce the water content to about 3 to 10% of the original content used in the preparation of the compound, thus retaining the adhesive in normally tacky or pressure sensitive condition. Where it is desired to have a substantially, normally dry adhesive coating activated by water, the quantity of hygroscopic material is reduced. In the formula above given, under L, where aqua resin is specified, a reduction of the aqua resin by about 10% will be sufficient to provide an adhesive coating which is normally dry, but is activatable by water. In the other formulae given for the preparation of the water soluble, normally pressure sensitive adhesive coating, a reduction of the hygroscopic material in percentages from 10 to 50% of the original amount given will be sufficient to provide a normally dry adhesive coating, readily responsive, however, to water to render the same active.

Where I have specified the provision of a water soluble, pressure sensitive adhesive coating in connection with regenerated cellulosic backing materials or sheeted material or cellulosic compounds, such as nitrocellulose or cellulose acetate, or the regenerated cellulose provided with waterproofing films to reduce the hygroscopicity of regenerated cellulose, those sheets may be characterized as being substantially impermeable and are particularly desirable with water soluble, normally tacky, pressure sensitive adhesive coatings, especially where these materials include hygroscopic agents or hygroscopic flexibilizing agents, in that when these materials are formed into rolls or stacks, the characteristics of the adhesive coating, whether pressure sensitive or normally dry and flexible, will be maintained without substantial variation, even though stored for long periods of time.

I may further insure against variation in the properties of the adhesive coating by providing rolls of this material with a sealing sheet covering the sides and edge of the roll. Sheets of waterproofed cellulose, cellulose acetate or cellulose nitrate may be used, though tin foil and similar metallic foils may also be used.

Where it is desirable to provide an adhesive sheet or tape of the normally dry solvent actuated type capable of forming a waterproof seal of unusual strength and having quick tack and rapid setting characteristics, I have found the following adhesive composition to be of particular value.

EXAMPLE M

| | Parts |
|---|---|
| Vinylite "A" resin (dissolved in 10 parts ethylene glycol) | 10 |
| Bakelite XRA 20 resin (dissolved in 6.6 parts di-acetone alcohol) | 10 |
| 1/2 second nitrocellulose solution | 2 |
| Dibutyl phthalate | 1 |

These ingredients are thoroughly mixed and applied to the backing material, the solvents being subsequently removed by evaporation, thus forming a normally dry coating which when moistened with a suitable solvent rapidly becomes adhesive and forms a quick setting bond of unusual strength.

I have found that adhesive tape made in accordance with Example M is of particular utility in sealing protective caps of Cellophane or other transparent material over the tops of milk bottles or other food containers.

In the examples enumerated, normally dry solvent activatable adhesive coatings have been specified, that is, that which may be activated by the application of water or an organic solvent, it is to be observed that such coatings which are normally dry may be activated to adhesiveness by the application of heat and the activation to adhesiveness may be made more rapid by combined action of the solvents and heat.

In general, it will be observed that I have provided compositions for a sealing of the adjacent layers of edges for packaging by a dissolving action of the fabric itself, constituting the packaging material and with a highly polished and lustrous, and/or transparent film of the character described, this is accomplished without altering these desirable properties.

Where, in addition to the waterproofing compositions forming films or layers for such sheets as are made from regenerated cellulose, the water-proofing surfaces include the adhesive compositions herein specified, activation or dissolution of these surfaces result in adhesion of contacting surfaces with a speed of operation heretofore unattained. The adhesive action is accomplished with a preservation of the desirable characteristics of the packaging material and even to the point of augmenting these desirable qualities by imparting a pigmenting action, carrying forward the general color motif of the package to which it is applied, in addition to other desirable properties previously indicated. The packaging materials have their utility extended in that their airproof and moistureproof qualities are augmented by providing seals which are as efficient in these properties as are the packaging materials themselves or the parts which the seals unite.

This application is a continuation-in-part of my prior filed application Serial No. 534,386 filed May 1, 1931.

I claim:

A viscous composition of matter adapted for use as an adhesive comprising an aqueous adhesive composition and a substantial proportion of a water-insoluble, unsaponifiable, readily volatile, organic liquid emulsified with the aqueous adhesive, the said organic liquid being substantially non-reactive with the adhesive composition.

RICHARD GURLEY DREW.